(12) United States Patent
Bobrek

(10) Patent No.: US 8,261,001 B2
(45) Date of Patent: Sep. 4, 2012

(54) NETWORK RANGE EXTENDER DEVICE

(75) Inventor: Pavlo Bobrek, Bradenton, FL (US)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 12/430,462

(22) Filed: Apr. 27, 2009

(65) Prior Publication Data

US 2010/0274927 A1    Oct. 28, 2010

(51) Int. Cl.
*G06F 13/36* (2006.01)
*G06F 1/26* (2006.01)

(52) U.S. Cl. ......... 710/310; 710/311; 710/314; 713/300

(58) Field of Classification Search .................... 713/300
See application file for complete search history.

(56) References Cited

U.S. PATENT DOCUMENTS

| | | | |
|---|---|---|---|
| 6,192,422 B1* | 2/2001 | Daines et al. | 710/29 |
| 6,741,612 B1* | 5/2004 | Butler et al. | 370/501 |
| 6,804,351 B1* | 10/2004 | Karam | 379/413 |
| 7,239,628 B1 | 7/2007 | Pendleton et al. | |
| 7,257,724 B2* | 8/2007 | Lehr et al. | 713/323 |
| 7,317,877 B2 | 1/2008 | Price | |
| 7,386,202 B2 | 6/2008 | Beshai et al. | |
| 7,486,630 B1 | 2/2009 | Mackay | |
| 7,489,872 B2 | 2/2009 | Chan et al. | |
| 7,494,287 B2 | 2/2009 | Wang et al. | |
| 7,809,476 B2* | 10/2010 | Cicchetti et al. | 700/286 |
| 7,809,960 B2* | 10/2010 | Cicchetti et al. | 713/300 |
| 7,873,057 B2* | 1/2011 | Robitaille et al. | 370/401 |
| 7,966,502 B2* | 6/2011 | Diab et al. | 713/300 |
| 7,974,305 B2* | 7/2011 | Diab | 370/463 |
| 2006/0100799 A1* | 5/2006 | Karam | 702/57 |
| 2006/0239183 A1* | 10/2006 | Robitaille et al. | 370/217 |
| 2006/0273661 A1* | 12/2006 | Toebes et al. | 307/106 |
| 2007/0021094 A1* | 1/2007 | Elkayam et al. | 455/402 |
| 2007/0041577 A1* | 2/2007 | Ghoshal et al. | 379/413 |
| 2007/0097933 A1* | 5/2007 | Kuc | 370/338 |
| 2007/0198748 A1* | 8/2007 | Ametsitsi et al. | 709/249 |
| 2007/0223520 A1* | 9/2007 | Diab | 370/463 |
| 2008/0290729 A1* | 11/2008 | Schoenberg et al. | 307/3 |
| 2009/0063874 A1* | 3/2009 | Diab | 713/300 |
| 2009/0228722 A1* | 9/2009 | Lin | 713/300 |

(Continued)

OTHER PUBLICATIONS

"IEEE Std 802.3af™"; The Institute of Electrical and Electronics Engineers, Inc.; Part 3; Jun. 18, 2003; all pages.*

(Continued)

*Primary Examiner* — Ryan Stiglic
(74) *Attorney, Agent, or Firm* — BainwoodHuang

(57) ABSTRACT

An apparatus includes a PHY assembly in electrical communication with a first interface assembly and with a second interface assembly, the PHY assembly configured to receive a power signal from a PSE, the PHY assembly having a first PHY and a second PHY. The first PHY is configured to receive a first data signal from the PSE through the first interface assembly via the frame-based computer networking connection and provide the first data signal to the second PHY for transmission to a network device through the second interface assembly via the frame-based computer networking connection. The second PHY is configured to receive a second data signal from the network device through the second interface assembly via the frame-based computer networking connection and provide the second data signal to the first PHY for transmission to the PSE through the first interface assembly via the frame-based computer networking connection.

19 Claims, 3 Drawing Sheets

U.S. PATENT DOCUMENTS

| | | | |
|---|---|---|---|
| 2010/0100750 A1* | 4/2010 | Bobrek | 713/300 |
| 2011/0004773 A1* | 1/2011 | Hussain et al. | 713/300 |
| 2011/0163605 A1* | 7/2011 | Ronen et al. | 307/71 |
| 2012/0030320 A1* | 2/2012 | Diab et al. | 709/220 |
| 2012/0063780 A1* | 3/2012 | Greenberg et al. | 398/58 |

OTHER PUBLICATIONS

"Veracity Outreach PoE-Powered LAN and PoE Repeater," Securityideas.com, http://www.sercurityideas.com/veoupolanand.html, accessed Mar. 6, 2009.

* cited by examiner

NETWORK RANGE EXTENDER DEVICE

BACKGROUND

The present disclosure pertains generally to the field of range extender devices.

Computer and information networks allow computerized devices to exchange content or data. For example, Local Area Networks (LANs) provide communications and allow content exchange between computerized devices in business, campus, and residential environments. The predominant protocol for LAN communications is Ethernet. The Ethernet physical and data link layer (e.g., Layer 1 and Layer 2) specifications define how computerized devices exchange content over various types of physical connections.

For example, certain conventional computerized devices configured for use on a LAN typically include a media access controller (MAC) and a physical interface transceiver (PHY). Conventional MACs are configured in the computerized devices as data link layers. Conventional PHYs connect corresponding MACs to a physical medium, such as a copper Category 5 (Cat5) twisted-pair wire or cable, and are configured to exchange data between the MAC and the physical medium. In a receive mode, the PHY receives data from the physical medium and decodes the data into a form appropriate for the receiving computerized device. In a transmit mode, the PHY takes data from the computerized device, typically from the MAC, and converts the data into a form appropriate for the physical medium in use.

In certain conventional LANs, a switch typically receives data from, and transmits data to, one or more computerized devices on the LAN via the Cat5 cable. However, based upon the relative physical proximity of the switch and the computerized devices in LAN, a Cat5 cable may be too short to connect a computerized device to the switch. In such a case, a female-to-female RJ-45 connector can be used to mate two or more Cat5 cables to achieve a desired cable length and allow the exchange of data between the switch and the computerized device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
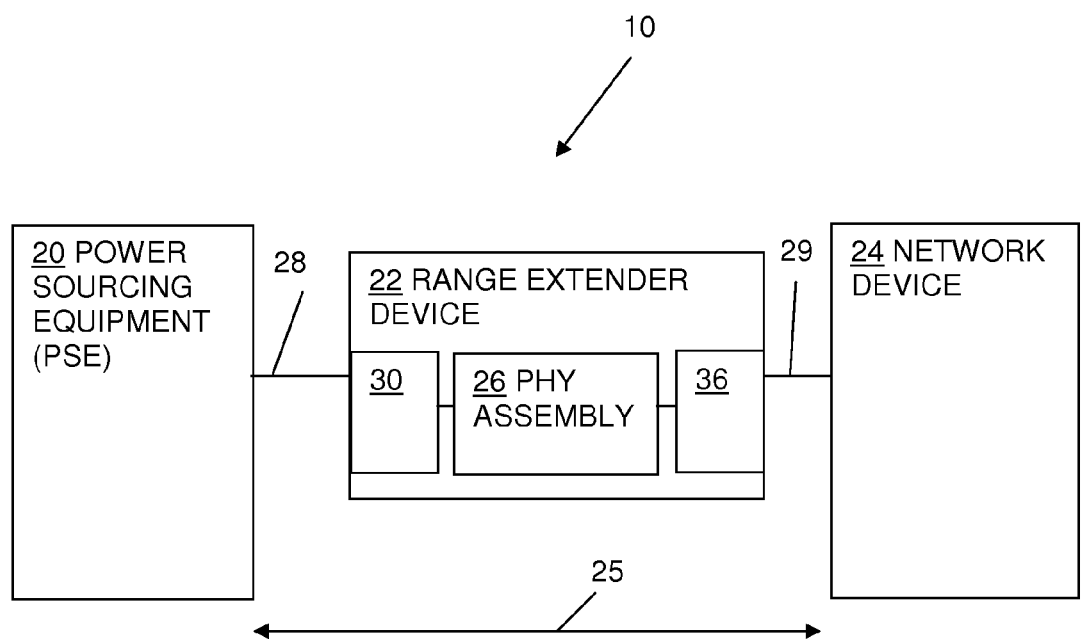
FIG. 1 illustrates an example schematic representation of a system having a network range extender device.

As indicated above, when a single Cat5 cable is too short to provide a physical connection between a switch and a computerized device in a LAN, a passive female-to-female RJ-45 connector can be used to mate two or more Cat5 cables to provide the connection. However, the use of the female-to-female RJ-45 connector can suffer from a variety of deficiencies.

For example, in a 1000BASE-T (e.g., 1 Gbit/sec) Ethernet based LAN, in order for communications to be passed reliably between the switch and the computerized device, twisted pair communications are limited to distances of up to 100 meters. Beyond distances of 100 meters in a 1000BASE-T Ethernet based LAN, the data signal carried by the Cat5 cables, from point to point, can become degraded, such as caused by a decrease in the data signal strength over such distances. Accordingly, in a 1000BASE-T Ethernet based LAN, the female-to-female RJ-45 cannot typically extend the length of a Cat5 cable beyond 100 meters which limits the relative positioning between the switch and the computerized device in the LAN.

In certain cases, the female-to-female RJ-45 provides reliable twisted pair communications between the switch and the computerized device for distances of up to several hundred meters. Such reliability is based upon the configuration of the LAN. For example, reliable twisted pair communications for distances of up to several hundred meters can be achieved by using relatively slower data transmission rates, such as those used for 100BASE-T or 10BASE-T LANs. As the length of twisted pair cables increases, the cables experience a greater end-to-end signal loss at the higher frequencies than at lower frequencies. These higher frequencies, which are critical for 1000BASE-T operation, are not critical for 100BASE-T or 10BASE-T. Thus, it is possible to communicate over relatively large distances using 100BASE-T or 10BASE-T LANs. However, configurations that employ 100BASE-T or 10BASE-T Ethernet LANs transmit data at a relatively slow data transmission rate compared to 1000BASE-T In certain cases, a LAN can utilize a repeater device, such as a hub, to extend the length of a Cat5 cable between a switch and a computerized device. However, conventional repeater devices are not typically configured to operate as Power-over-Ethernet (PoE) devices and require powering from an external power source, such as a wall outlet, in order to operate. Accordingly, in order to receive power during operation, the location of the repeater device in the LAN is limited to areas with access to a power source.

It would be desirable for a range extender device to allow data signals to be provided, via a Cat5 cable, from an upstream device to a downstream device located in excess of 100 meters from the upstream device in a 1000BASE-T Ethernet based LAN. It would be desirable for the range extender device to receive power via the Cat5 cable connection with the upstream device. It would also be desirable for the range extender device to provide power to the downstream device via the Cat5 cable connection with the downstream device.

Generally, a disclosed range extender includes a physical interface transceiver (PHY) assembly in electrical communication with a first interface assembly and with a second interface assembly, the PHY assembly configured to receive a power signal from power sourcing equipment (PSE) through the first interface assembly via a frame-based computer networking connection, the PHY assembly having a first PHY and a second PHY. The first PHY is configured to, using the power signal, receive a first data signal from the PSE through the first interface assembly via the frame-based computer networking connection and provide the first data signal to the second PHY for transmission to a network device through the second interface assembly via the frame-based computer networking connection. The second PHY is configured to, using the power signal, receive a second data signal from the network device through the second interface assembly via the frame-based computer networking connection and provide the second data signal to the first PHY for transmission to the PSE through the first interface assembly via the frame-based computer networking connection.

DESCRIPTION OF EXAMPLE EMBODIMENTS

FIG. 1 illustrates a block diagram of a computer network 10 that includes power sourcing equipment (PSE) 20, a range extender device 22, and a network device 24. In one arrangement, the computer system 10 is configured as a 1000BASE-T Ethernet Local Area Network (LAN).

The PSE 20, in one arrangement, is configured as a subsystem of a data communications device, such as a router, switch, or hub, which is configured to exchange both data signals and power signals with the range extender device 22 during operation. For example, the PSE 20 is electrically coupled to the range extender device 22 via a multiple-conductor twisted-pair cable 28, such as a Category 5 twisted-pair cable, commonly used for Ethernet communications. The PSE 20 is configured to provide both data and power signals to the range extender device 22 via the cable 28.

The network device 24 is configured as an Ethernet device, such as a personal computer, an Internet Protocol (IP) phone, or another range extender or a network switch. The network device 24 is configured to exchange data signals with the range extender device 22 during operation. For example, the network device 24 is electrically coupled to the range extender device 22 via a multiple-conductor twisted-pair cable 29, such as a Category 5 twisted-pair cable 29.

The range extender device 22, in one arrangement, is configured as a 1000BASE-T Ethernet (i.e., Gigabit Ethernet) device that operates as a data signal repeater for data signals transmitted between the PSE 20 and the network device 24 within the 1000BASE-T Ethernet LAN 10. For example, the range extender device 22 includes a physical interface transceiver (PHY) assembly 26 disposed in electrical communication with a first interface assembly 30 and with a second interface assembly 36. As will be described in detail below, the range extender device 22 is configured to receive a power signal from the PSE 20 via the multiple-conductor twisted-pair cable 28 and the first interface assembly 30. The range extender device 22 is configured to utilize the power signal received from the PSE 20 to allow the PHY assembly 26 to repeat data signals between the PSE 20 and network device 24 via the first and second interface assemblies 30, 36 respectively.

With such a configuration, the range extender device 22 extends the range of continuous gigabit Ethernet transmission between the PSE 20 and the network device 24. For example, the range extender device 22 can provide 1000BASE-T Ethernet transmission of data signals between the PSE 20 and the network device 24 for distances 25 in excess of 100 meters while maintaining a relatively high integrity of the data signals (e.g., minimizing loss of data) during transmission. Furthermore, because the range extender device 22 receives the power signal from the PSE 20 via the multiple-conductor twisted-pair cable 28, the range extender device 22 can operate at a variety of geographic locations within the computer network 10, regardless of the proximity of the range extender device 22 to a power source, such as a wall outlet. Accordingly, the location of the range extender device 22 within the computer network 10 is not limited to locations with local access to a power source.

Figure 2:
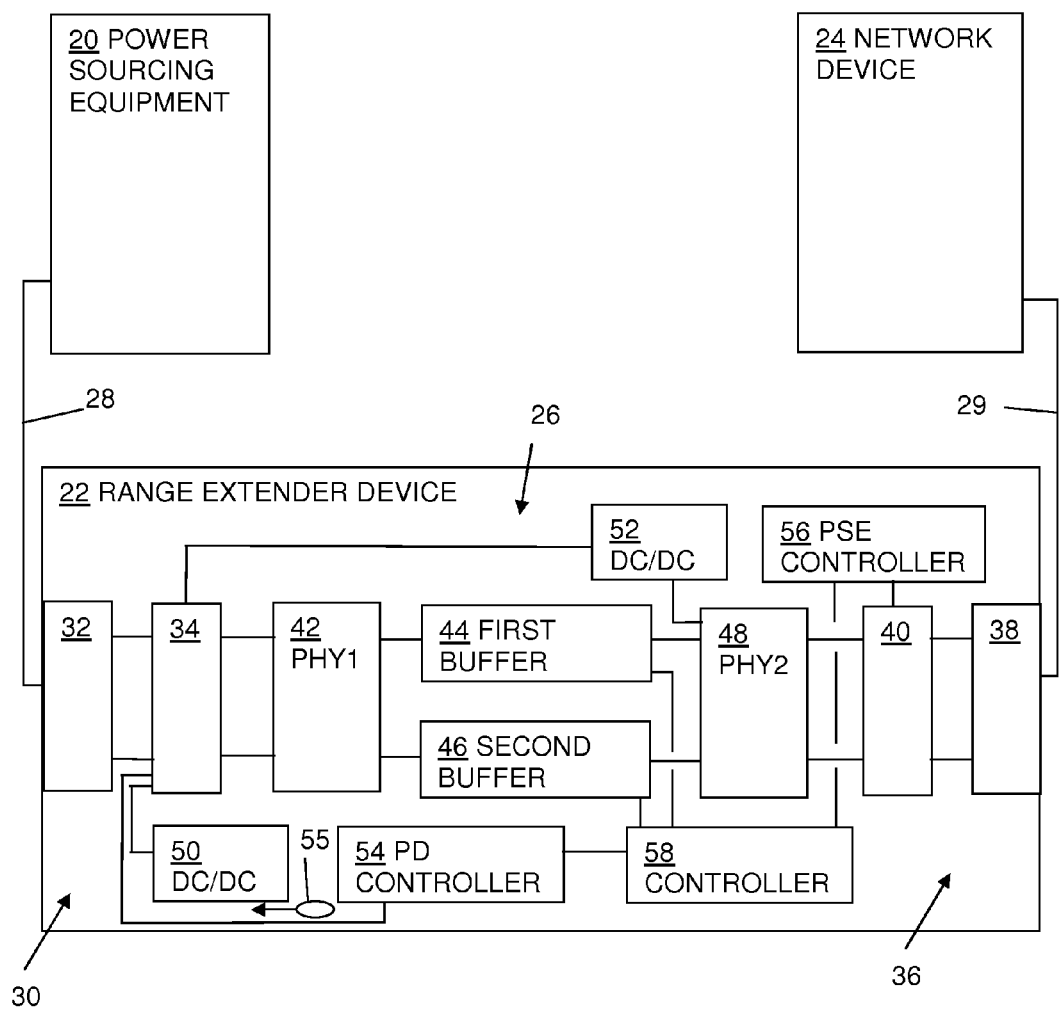
FIG. 2 is an example schematic representation of the range extender device of FIG. 1.

The range extender device 22 can be configured in a variety of ways. FIG. 2 is an example schematic representation of the range extender device 22, according to one configuration.

As indicated above, the range extender device 22 includes first and second interface assemblies 30, 36 respectively. As illustrated in FIG. 2, the first interface assembly 30 includes a first port 32 and a first set of magnetic transformers 34. The first port 32, such as an RJ-45 port, is configured to provide physical and electrical coupling of the range extender device 22 to the multiple-conductor twisted-pair cable 28. The first set of magnetic transformers 34 is configured to minimize voltage imbalances between two wires forming a twisted-pair of the cable 28 in order to exchange data as differential signals transmitted over twisted pairs between the first port 32 and the PHY assembly 26 and to enable the PSE 20 to convey power as a common mode signal which does not interfere with differential data transmission. Also as shown in FIG. 2, the second interface assembly 36 includes a second port 38 and a second set of magnetic transformers 40. The second port 38, such as an RJ-45 port, is configured to provide physical and electrical coupling of the range extender device 22 to the multiple-conductor twisted-pair cable 29. The second set of magnetic transformers 40 is configured to minimize voltage imbalances between two wires forming a twisted-pair of the cable 29 in order to exchange data as differential signals between the second port 38 and the PHY assembly 26 and to enable the range extender device 22 to convey power as a common mode signal which does not interfere with differential data transmission.

As described above, the range extender device 22 is configured to receive power from the PSE 20 to allow operation of the PHY assembly 26. In one arrangement, to receive a power signal from the PSE 20, the range extender device 22 includes a powered device (PD) controller 54 and a first power converter 50, such as a DC-to-DC converter, disposed in electrical communication between the first port 32 (through a first set of magnetic transformers 34) and the PHY assembly 26. In one arrangement, the PD controller 54 is configured to provide a power classification of the range extender device 22 while the first power converter 50 is configured to convert a voltage level of the power signal received, in response to the classification procedure, from a relatively higher first voltage level received by the range extender device 22 to a relatively lower second voltage level for use by the PHY assembly 26.

For example, prior to operation, a user electrically couples the first port 32 of the range extender device 22 to the PSE 20 using the multiple-conductor twisted-pair cable 28. In response to such coupling, a controller of the PSE 20, such as an LTC4259A-1 Quad IEEE 802.3af Power over Ethernet Controller (Linear Technology, Milpitas, Calif.) performs a powered device discovery procedure to detect the range extender device 22 as being configured as a powered device (PD) that can receive power over the Ethernet (PoE) from the PSE 20. A typical PD discovery procedure, such as IEEE802.3af, consists of three phases, namely, detection, classification, and power-up. In IEEE802.3af, for example, the PSE 20 detects a common mode resistance associated with the range extender device 22. In response to such detection, a controller of the PSE 20 engages in a power classification protocol, for example the classification protocol specified by IEEE 802.3af, where the power level desired by a powered device (i.e., the range extender device 22) during normal operation is indicated by the relative magnitude of power consumed during classification when the range extender device 22 is probed by the PSE 20 with a specific voltage or current level commensurate with the classification phase of discovery. By controlling the amount of power consumed during the classification phase, the powered device controller 54 effectively transmits a classification signal 55 to the PSE 20 to indicate to the PSE 20 a power classification, such as the IEEE 802.3af power classification, of the range extender device 22.

In response to the classification signal 55, the PSE 20 provides a power signal to the range extender device 22 where the power signal has a voltage in the range between about 45 volts and 52 volts, such as a voltage of 48 volts. As range extender device 22 receives power signal, the first power converter 50 in turn receives the power signal from the first interface assembly 30 through magnetic transformers 34, and reduces the voltage of the power signal to an operational voltage, to be utilized by the PHY assembly 26. For example, when the PSE 20 provides the power signal having a voltage in the range between about 45 volts and 52 volts (e.g., 48 volts), the first power converter 50 reduces the voltage of the power signal to a range between about 3 volts and 4 volts. The first power converter 50 provides the reduced voltage power signal to the PHY assembly 26, thereby allowing the first PHY 42 and the second PHY 48 to operate.

As illustrated in FIG. 2, the PHY assembly 26 includes a first PHY 42 and a second PHY 48, each in electrical communication with the other and where the first PHY 42 is in electrical communication with the first interface assembly 30 while the second PHY 48 is in electrical communication with the second interface assembly 36. Each of the first PHY 42 and the second PHY 48 can have a variety of configurations. For example, the first PHY 42 and the second PHY 48 can be configured as a Serial Gigabit Media Independent Interface (SGMII), a 10 Gigabit Attachment Unit Interface (XAUI), or a High Speed Serial Interface for XFP (XFI). As illustrated, the first and second PHYs 42, 28 are arranged in a back-to-back arrangement and are configured to actively repeat data signals or frames received by the range extender device 22. For example, the first PHY 42 is configured to receive data signals from the PSE and actively repeat the data signals to the second PHY 48 for transmission to the network device 24. Additionally, the second PHY 48 is configured to receive data signals from the network device 24 and actively repeat the data signals to the first PHY 42 fro transmission to the PSE 20. With active repeating of the data signals, each PHY 42, 48 provides, for example, amplification of the data signal received prior to transmission to the other PHY 42, 48. Such active repeating minimizes degradation of the data signal as the range extender device 22 transmits the data signal through the network 10.

Figure 3:
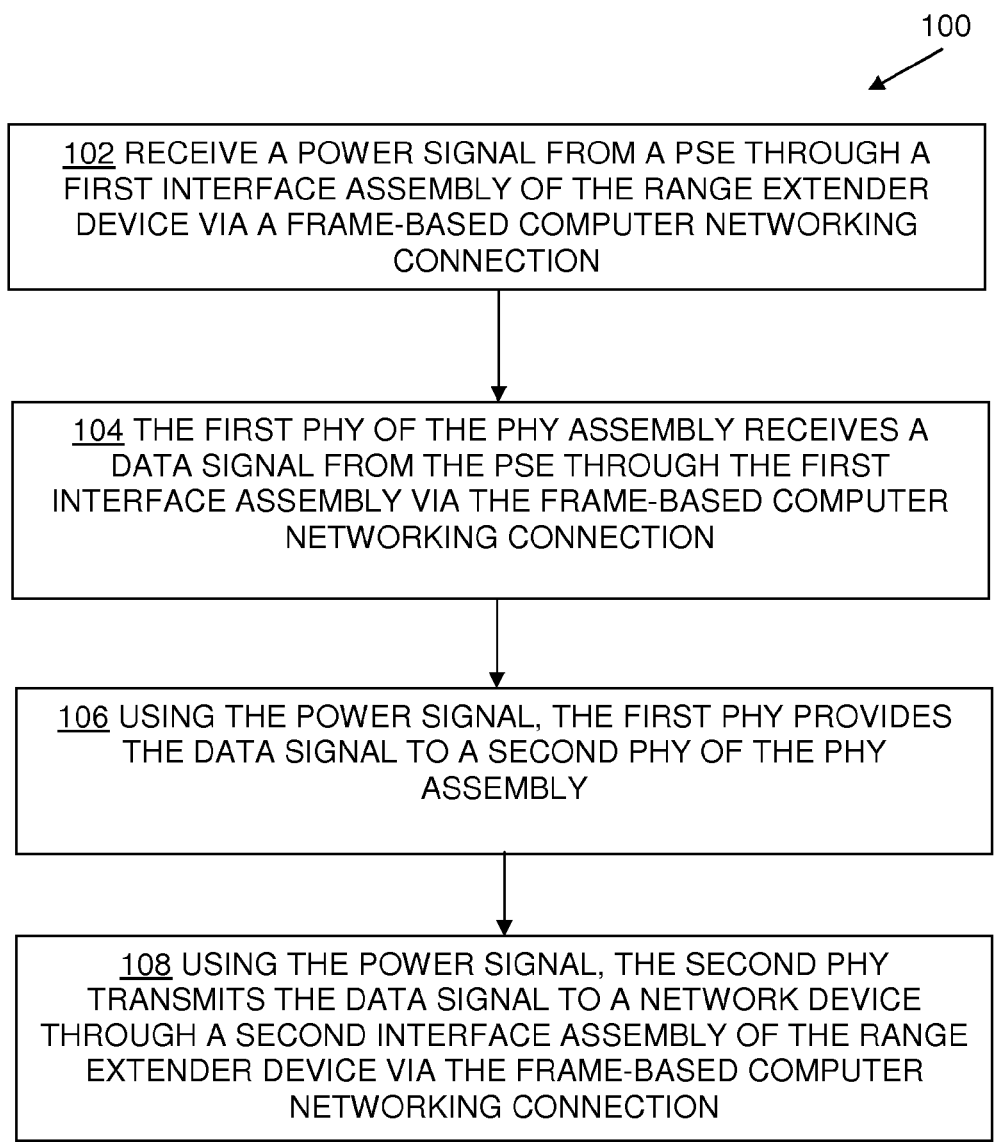
FIG. 3 illustrates an example method of operation of the range extender device of FIG. 1.

During operation, the range extender device 22 is configured to receive data signals from the PSE 20 and provide the data signals to the network device 24. FIG. 3 illustrates an example method of operation 100 of the range extender device 22.

In step 102 the PHY assembly 26 of the range extender device 22 receives a power signal from a PSE 20 through a first interface assembly 30 of the range extender device 22 via a frame-based computer networking connection. For example, the cable 28, such as a 1000BASE-T standard for Ethernet over twisted-pair cable, provides power and the frame-based computer networking connection from the PSE 20 to the first interface assembly 30. As indicated above, the first power converter 50 of the first interface assembly reduces a voltage level of the power signal to an appropriate voltage level for operation of the first PHY 42 and the second PHY 48 of the PHY assembly 26.

In step 104, the first PHY 42 of the PHY assembly 26 receives a data signal from the PSE 20 through the first interface assembly 30 via the frame-based computer networking connection. For example, the PSE 20 transmits the data signal to the first PHY 42 via a twisted-pair cable 28 using the 1000BASE-T standard for Ethernet over twisted-pair cable.

In step 106, using the power signal, the first PHY 42 provides the data signal to a second PHY 46 of the PHY assembly. For example, the first PHY 42 repeats the data signal, such as a frame, to the second PHY 46. With such repeating, for example, the first PHY 42 can amplify the data to minimize degradation of the data signal.

In step 108, using the power signal, the second PHY 48 transmits the data signal to a network device 24 through a second interface assembly 36 of the range extender device 22 via the frame-based computer networking connection. For example, as the second PHY 48 receives the repeated data signal, the second PHY provides the data signal to the network device 24 using the 1000BASE-T standard for Ethernet over twisted-pair cable 29.

With the use of back to back PHYs 42, 42 in such a configuration, the range extender device 22 operates as an active repeater powered by the PSE 20. Accordingly, the range extender device provides 1000BASE-T Ethernet transmission of data signals between the PSE 20 and the network device 24 for distances 25 in excess of 100 meters while maintaining a relatively high integrity of the data signals (e.g., minimizing loss of data) during transmission. Additionally, because the range extender device 22 is configured to operate on power received via the PSE 20, the range extender device 22 can be physically located anywhere in LAN 10, and is not limited to being positioned near a power source, such as a wall outlet.

In certain cases, the range extender device 22 can receive a data signal from a network device, such as the PSE 20, prior to an attached, downstream network device, such as network device 24, being available to receive the data signal. In one arrangement, the PHY assembly 26 includes data buffers to store data received by the range extender device 22 in order to allow enough time for the downstream network device 24 to transition from an inactive state to an active state. For example, returning to FIG. 2, the PHY assembly 26 includes a first buffer 44 in electrical communication with the first and second PHYs 42, 48 and a second buffer 46 in electrical communication with the first and second PHYs 42, 48. Each buffer 44, 46 is configured as a unidirectional buffer. For example, the first buffer 44 is configured to receive a data signal from the first PHY 42, store the data signal, and pass the data signal to the second PHY 48 while the second buffer 46 is configured to receive a data signal from the second PHY 48, store the data signal, and pass the data signal to the first PHY 42. In use, the buffers 44, 46 allow the range extender device to store data signals to allow a far end device, either the PSE 20 or the network device 24, to transition from an inactive state to an active state such that the device can actively receive the data while minimizing data loss. In one arrangement, the range extender device 22 also includes a controller 58, such as a processor and memory, disposed in electrical communication with the first and second buffers 44, 46. The controller is configured to monitor and manage the buffers to minimize buffer overrun.

As indicated above, the range extender device 22 is configured as a powered device to receive power from the PSE 20. In one arrangement, the range extender device 22 is also configured to operate as power sourcing equipment to provide power to a downstream device, such as the network device 24. Accordingly, in such an arrangement, the range extender device 22 is capable of both extending the range of data transmission over a 1000BASE-T Ethernet network and providing power to a downstream network device 24 over the extended range (e.g., a range of several hundred meters).

For example, as illustrated in FIG. 2, the range extender device 22 includes a power sourcing equipment controller 56 in electrical communication with the second set of magnetic transformers 40 and a second power converter 52 in electrical communication with the first set of magnetic transformers 34 and the second PHY 48. The power sourcing equipment controller 56 is configured to detect electrical connection of a powered device, such as the network device 24, to the second interface assembly 36, perform a powered device classification procedure of the powered device 24, and provide a powered device power signal to the powered device 24. For example, in one arrangement, the power sourcing equipment controller 56 is configured as an LTC4259A-1 Quad IEEE 802.3af Power over Ethernet Controller (Linear Technology, Milpitas, Calif.) and performs the powered device detection procedure to detect the powered device 24 as being configured as a powered device that can receive power over the Ethernet (PoE) from the range extender device 22. In response to the detection, the power sourcing equipment controller 56 classifies the network device 24 and provides an appropriate amount of power to the network device 24 as provided through the first interface assembly 30 and second power converter 52.

In use, as the first interface assembly 30 receives power for transmission to the network device 24, a voltage level of the received power signal can be less than a voltage level of the power signal transmitted by the PSE 20, as caused by transmission losses through the cable 28. To correct for the loss, for example, in order to provide a voltage level between 45 volts and 52 volts to the cable 29, as expected of a PSE, the second power converter 52 is configured to receive the reduced voltage level of the power signal from the first set of magnetic transformers 34 and adjust its output voltage level from the reduced voltage level (e.g., 40 volts), such as received from the cable 28, to a higher or transmitted voltage level (e.g., 48 volts), such as initially provided by the PSE 20, for provision to the network device 24. Accordingly, the second power converter 52 minimizes any losses in the voltage level of the power signal received from the PSE 20 as caused by voltage drops in the cable 28.

While various embodiments of the invention have been particularly shown and described, it will be understood by those skilled in the art that various changes in form and details may be made therein without departing from the spirit and scope of the invention as defined by the appended claims.

With respect to FIG. 2, the computer network 10 was described as having a single range extender device 22 that electrically coupled the PSE 20 to a network device 24. Such description is by way of example only. In one arrangement, the computer network 10 includes any number of range extender devices 22 coupled together in a daisy-chain configuration to extend a distance 25 between the PSE and the network device 24. For example, the computer network 10 can include a PSE 20 electrically coupled by a first twisted pair cable to a first range extender device 22 which is in turn electrically coupled to a second range extender device via a second twisted pair cable. The second range extender device electrically couples to the network device 24 via a third twisted pair cable. In such a configuration, the first and second range extender devices 22 are disposed in the network 10 in a daisy chain manner to extend the connection distance between the PSE 20 and the network device 24 to greater than 200 meters.

In the case where multiple range extender devices 22 have been interconnected in a cascading or daisy-chained configuration, in one arrangement, each upstream range extender device 22 (i.e., the range extender device 22 closest to the PSE) is configured to negotiate and provide power to a subsequently daisy-chained downstream range extender device 22. For example, the PSE controller 56 of each range extender device 22 can be configured as an IEEE802.3af or IEEE802.3at compatible power controller. With such a configuration, once an upstream range extender device receives power from the PSE 20, a downstream range extender device can negotiate with the upstream range extender device for its power requirement.

As described above, the computer system 10 is configured as a 1000BASE-T Local Area Network (LAN) and the range extender device 22, is configured as a 1000BASE-T Ethernet (i.e., Gigabit Ethernet) device. Such description is by way of example only. In one arrangement, computer system 10 and the range extender device 22 are configured to operate at relatively higher speeds. For example, in one arrangement, the computer system 10 is configured as a 10GBASE-T LAN and the range extender device 22, is configured as a 10GBASE-T device.

As described above, the range extender device 22 includes a first power converter 50 that is configured to convert a voltage level of the power signal received from a relatively higher first voltage level received by the range extender device 22 to a relatively lower second voltage level for use by the PHY assembly 26. Also as described above, the range extender device 22 includes a second power converter 52 configured to adjust the voltage level of the power signal from a lower voltage level to a higher voltage level for provision to an attached powered device. Such description is by way of example only. In one arrangement, the range extender device 22 includes a single power converter configured to both lower and raise the voltage level of the power signal received from the PSE 20 through cable 28, as appropriate.

What is claimed is:
1. A method, comprising:
receiving, by a physical interface transceiver (PHY) assembly of a range extender device, a power signal from power sourcing equipment (PSE) through a first interface assembly of the range extender device via a computer networking connection;
receiving, by a first PHY of the PHY assembly, a data signal from the PSE through the first interface assembly, the data signal having a voltage;
using the power signal, providing, by the first PHY, the data signal to a second PHY of the PHY assembly;
using the power signal, transmitting, by the second PHY, the data signal to a second network device through a second interface assembly of the range extender device;
receiving by a first buffer of the range extender device, the data signal from the first PHY;
storing, by the first buffer, the data signal, while the second network device assumes an inactive state; and
providing, by the first buffer, the data signal to the second PHY after the second network device makes a transition from the inactive state to an active state.
2. The method of claim 1, comprising providing, by a powered device controller of the range extender device in electrical communication with the first interface assembly, a power classification of the range extender device to the PSE.
3. The apparatus of claim 2, comprising, in response to the power classification of the range extender device:
receiving, by a first power converter of the range extender device, the power signal;

converting, by the first power converter, a voltage level of the power signal from a first voltage level to a second voltage level, the second voltage level being less than the first voltage level; and providing, by the first power converter, the power signal at the second voltage level to the PHY assembly.

4. The method of claim 1, comprising:

detecting, by a power sourcing equipment controller of the range extender device, electrical connection of a powered device to the second interface assembly;

performing, by the power sourcing equipment controller, a powered device classification procedure of the powered device; and providing, by the power sourcing equipment controller, a powered device power signal to the powered device.

5. The method of claim 4, comprising:

receiving, by a second power converter of the range extender device, the power signal having a reduced voltage level, the reduced voltage level of the power signal being less than a transmitted voltage level of the power signal as provided the PSE;

adjusting, by the second power converter, the voltage level of the power signal from the reduced voltage level to the transmitted voltage level; and providing, by the second power converter, the power signal having the transmitted voltage level, to the power sourcing equipment controller.

6. The method of claim 1, wherein receiving, by the first PHY of the PHY assembly, the data signal from the PSE through the first interface assembly comprises receiving, by the first PHY of the PHY assembly, the data signal from the PSE through the first interface assembly via at least a 1000BASE-T standard for Ethernet over twisted-pair cable.

7. The method of claim 1, wherein transmitting, by the second PHY, the data signal to the second network device through the second interface assembly of the range extender device comprises transmitting, by the second PHY, the data signal to the second network device through the second interface assembly of the range extender device via. at least a 1000BASE-T standard for Ethernet over twisted-pair cable.

8. The method of claim 7, comprising providing, by the PHY assembly, an Ethernet over twisted-pair cable transmission range of greater than 100 meters between the PSE in electrical communication with the first interface assembly and the network device in electrical communication with the second interface assembly.

9. An apparatus, comprising:

a physical interface transceiver (PHY) assembly in electrical communication with a first interface assembly and with a second interface assembly, the PHY assembly configured to receive a power signal from power sourcing equipment (PSE) through the first interface assembly via a computer networking connection, the PHY assembly having a first PHY and a second PHY;

the first PHY configured to, using the power signal, receive a first data signal from the PSE through the first interface assembly and provide the first data signal to the second PHY for transmission to a network device through the second interface assembly; and the second PHY configured to, using the power signal, receive a second data signal from the network device through the second interface assembly and provide the second data signal to the first PHY for transmission to the PSE through the first interface assembly, wherein the PHY assembly includes a first buffer in electrical communication with the first PHY and with the second PHY, the first buffer configured to receive the first data signal from the first PHY, store the first data signal, and provide the first data signal to the second PHY, and a second buffer in electrical communication with the first PHY and with the second PHY, the second buffer configured to receive the second data signal from the second PHY, store the second data signal, and provide the second data signal to the first PHY, wherein the first buffer is configured to (i) hold the first data signal in the first buffer while the network device assumes an inactive state and (ii) provide the first data from the first buffer to the second PHY when the network device makes a transition from the inactive state to an active state, and wherein the second buffer is configured to (i) hold the second data signal in the second buffer while the PSE assumes an inactive state and (ii) provide the second data from the second buffer to the first PHY when the PSE makes a transition from the inactive state to an active state.

10. The apparatus of claim 9, comprising a powered device controller in electrical communication with the first interface assembly, the powered device controller configured to provide a power classification of the apparatus to the PSE.

11. The apparatus of claim 10, comprising a first power converter in electrical communication with the first interface assembly and with the PHY assembly, the first power converter configured, in response to the power classification of the apparatus, to receive the power signal, convert a voltage level of the power signal from a first voltage level to a second voltage level, the second voltage level being less than the first voltage level, and provide the power signal at the second voltage level to the PHY assembly.

12. The apparatus of claim 9, comprising a power sourcing equipment controller in electrical communication with the second interface assembly, the power sourcing equipment controller configured to detect electrical connection of a powered device to the second interface assembly, perform a powered device classification procedure of the powered device, and provide a powered device power signal to the powered device.

13. The apparatus of claim 9, wherein:

the first interface assembly is configured to receive the first data signal via a first twisted-pair cable using at least a 1000BASE-T standard for Ethernet over twisted-pair cable; and the second interface assembly is configured to transmit the first data signal via a second twisted-pair cable using at least the 1000BASE-T standard for Ethernet over twisted-pair cable.

14. The apparatus of claim 13, wherein:

the second interface assembly is configured to receive the second data signal via a first twisted-pair cable using at least a 1000BASE-T standard for Ethernet over twisted-pair cable; and the first interface assembly is configured to transmit the second data signal via a second twisted-pair cable using at least the 1000BASE-T standard for Ethernet over twisted-pair cable.

15. The apparatus of claim 14, wherein the apparatus is configured to provide, between the PSE in electrical communication with the first interface assembly and the network device in electrical communication with the second interface assembly, an Ethernet over twisted-pair cable transmission range of greater than 100 meters.

16. The apparatus as recited in claim 9, further comprising a controller disposed in electrical communication with the first buffer and the second buffer and configured to monitor and manage the first buffer and the second buffer to minimize buffer overrun.

17. The apparatus as recited in claim 9, further comprising a power converter in electrical communication with the first interface assembly, the second interface assembly, and the PHY assembly, the power converter configured to:
   receive the power signal,
   convert the power signal from a first voltage level to a second voltage level,
   convert the power signal from the first voltage level to a third voltage level,
   provide the power signal at the second voltage level to the PHY assembly, and
   provide the power signal at the third voltage level to the network device,
   wherein the second voltage level is less than the first voltage level and the third voltage level is greater than the first voltage level.

18. A method for extending network signals over network cables, comprising:
   receiving at least one network signal from power sourcing equipment (PSE) via a first network cable;
   processing the at least one network signal to extract a power signal and a signal;
   apply the power signal to operate first and second Physical Interface Transceivers (PHYs);
   processing the data signal by the first PHY to produce an intermediate data signal;
   processing the intermediate data signal by the second PHY to produce a processed data signal, the processed data signal having a voltage;
   boosting the voltage of the processed data signal using power derived from the power signal;
   transmitting the boosted data signal to a powered device (PD) over a second network cable;
   holding the intermediate data signal from the first PHY in a buffer while the PD assumes an inactive state; and
   releasing the intermediate data signal from the buffer into the second PHY in response to the PD making a transition from the inactive state to an active state.

19. The method as recited in claim 18, wherein the data signal is a first data signal, the intermediate data signal is a first intermediate data signal, and the method further comprises:
   receiving a second data signal over the second cable from the remote device;
   processing the second data signal by the second PHY to produce a second intermediate data signal;
   holding the second intermediate data signal from the second PHY in a second buffer while the PSE assumes an inactive state; and
   releasing the second intermediate data signal from the second buffer into the first PHY in response to the PSE making a transition from the inactive state to an active state.

* * * * *

UNITED STATES PATENT AND TRADEMARK OFFICE
CERTIFICATE OF CORRECTION

PATENT NO. : 8,261,001 B2  
APPLICATION NO. : 12/430462  
DATED : September 4, 2012  
INVENTOR(S) : Pavlo Bobrek Page 1 of 1

It is certified that error appears in the above-identified patent and that said Letters Patent is hereby corrected as shown below:

In the Claims:

Column 11, Claim 18, Lines 25-26, "power signal and a signal; apply the power signal to operate first and second Physical" should read --power signal and a data signal; applying the power signal to operate first and second Physical--.

Signed and Sealed this  
Sixteenth Day of October, 2012

David J. Kappos  
*Director of the United States Patent and Trademark Office*